United States Patent [19]
Lindsey

[11] Patent Number: 5,282,640
[45] Date of Patent: Feb. 1, 1994

[54] EXERCISE BICYCLE

[76] Inventor: Ben Lindsey, P.O. Box 1256, Maljamar, N. Mex. 88264

[21] Appl. No.: 436,730

[22] Filed: Nov. 15, 1989

[51] Int. Cl.[5] ............... B62M 1/16; B62M 1/12
[52] U.S. Cl. .................... 280/234; 280/233; 280/242.1; 280/244; 280/247
[58] Field of Search ............... 280/233, 234, 244, 246, 280/247, 248, 249, 250, 250.1, 230, 261, 242.1; 464/30, 87, 92; 301/6 R, 6 D

[56] References Cited

U.S. PATENT DOCUMENTS

| | | | |
|---|---|---|---|
| 4,108,459 | 8/1978 | Alvigini | 280/215 |
| 4,560,181 | 12/1985 | Herron | 280/250.1 |
| 4,584,889 | 4/1986 | Patroni, Jr. | 280/248 |

Primary Examiner—Mitchell J. Hill

[57] ABSTRACT

An O-ring is mounted to the wheel of a manually powered bicycle. A Teflon washer is mounted on the wheel sprocket contacting the O-ring. The friction between the O-ring and the Teflon washer are sufficient to move the crank sprocket away from dead center on a mechanism wherein the crank sprocket is rotated by manually oscillating the handle bars of the bicycle.

4 Claims, 2 Drawing Sheets

EXERCISE BICYCLE

RIGHTS TO INVENTIONS UNDER FEDERAL RESEARCH

There was no federally sponsored research and development concerning this invention.

BACKGROUND OF THE INVENTION (1) Field of the Invention

This invention relates to exercise bicycle and more particularly to bicycles at least partially powered by manual movement of the handle bars.

(2) Description of the Related Art

Manually powered bicycles as opposed to pedal powered bicycles are old and have been well known for many years.

The term bicycle is used in this application in its broadest term, i.e., any two-wheeled vehicle. However, in this application the term will be used for those two-wheeled vehicles which are powered by the physical exertions of at least one person. It will be seen by this definition that a scooter would fit within this definition as well as the vehicle more commonly referred to as a bicycle.

A particular type of manual powered bicycles is one having the handle bars oscillating at the top of the fork. The handle bars then drive a crank sprocket through a pitman. The crank sprocket is mounted to the fork and steering post of the bicycle so that it retains the same relationship to the front wheel and to the handle bars.

The front wheel is driven through a one-way clutch attached to a wheel sprocket co-axiel with the front wheel. The development of the one-way clutches are such that they have extremely low friction and therefore the wheel does not drive the sprockets when it is in the "free-wheeling mode". This is desirable.

A common problem of such bicycles is that the drive sprocket gets locked in a dead-center position. I.e., the pitman from the oscillating handle bars is aligned with the crank extending from the axle of the sprocket to the crank pin on the sprocket. In dead-center position, the handle bars can not be moved or manipulated to cause rotation of the sprocket and therefore, no motive power can be transmitted to the vehicle.

My previous two patents, 4,147,370 issued Apr. 3, 1979 and 4,189,166 issued Feb. 19, 1980, solved this problem by having a spring which moved the crank sprocket away from dead center.

SUMMARY OF THE INVENTION (1) Progressive Contribution to the Art

I have found and devised an improved solution for this problem. I have found that by placing a small friction device between the front wheel and the wheel sprocket that this additional friction will be enough to turn the wheel sprocket and thus the crank sprocket through the drive chain enough to bring the crank sprocket off dead center. It is desirable to have as little friction as possible in this drive transmission unit. I have found that a preferred solution is to have a Teflon fluor-carbon resins washer mounted upon the sprocket and a rubber O-ring mounted upon the wheel. The pressure between the Teflon fluor-carbon resins washer and the rubber ring can be adjusted readily, therefore it is possible to have an adjustable frictional drive so that the friction is great enough to rotate the crank sprocket off dead center but not great enough to otherwise impair the smooth efficient operation of the vehicle.

(2) Objects of this Invention

An object of this invention is to provide a manually powered bicycle.

Another object is to provide a manually powered bicycle which does not lock down because the crank sprocket is on dead center.

Further objects are to achieve the above with devices that are sturdy, compact, durable, lightweight, simple, safe, efficient, versatile, ecologically compatible, energy conserving, and reliable, yet inexpensive and easy to manufacture, attach, adjust, operate and maintain.

Other objects are to achieve the above with a method that is rapid, versatile, ecologically compatible, energy conserving, efficient, and inexpensive, and does not require skilled people to attach, adjust, operate, and maintain.

The specific nature of the invention, as well as other objects, uses, and advantages thereof, will clearly appear from the following description and from the accompanying drawing, the different views of which are not scale drawings.

Figure 1:
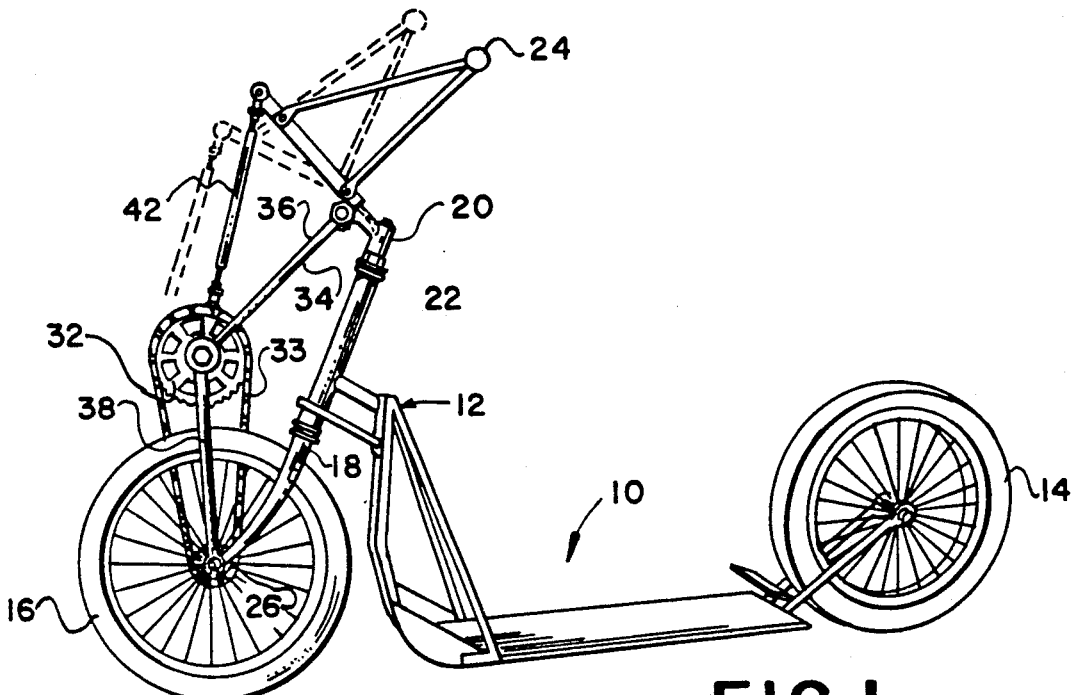
FIG. 1 is a perspective view of this invention mounted upon a scooter type bicycle.
Figure 2:
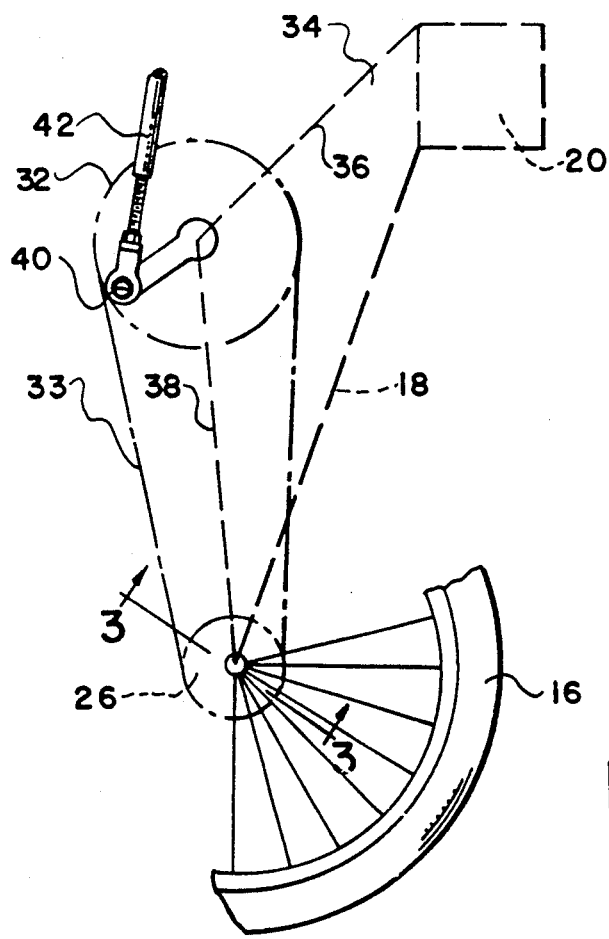
FIG. 2 is a schematic representation of the drive including the drive sprocket and wheel sprocket.

As an aid to correlating the terms of the claims to the exemplary drawing, the following catalog of elements and steps is provided:

10. Person powered scooter
12. Frame
13. Pedals
14. Rear wheel
16. Front wheel
18. Fork
20. Steering post
22. Support column
24. Handle bar
26. Wheel sprocket
28. One-way free wheeling clutch
30. Hub
32. Crank sprocket
33. Connecting chain
34. Forward subframe
36. Top strut
38. Bottom strut
40. Crank pin
42. Pitman
44. Axle
46. Nuts
50. Teflon fluor-carbon resins washer
52. Rubber O-ring

DESCRIPTION OF THE PREFERRED EMBODIMENT

Referring to the drawing, there may be seen two typical person powered vehicles.

FIG. 1 illustrates person powered scooter 10 having frame 12. Rear wheel 14 and front wheel 16 are journaled to the frame 12. Fork 18 journaled by steering post 20 into support column 22 is considered to be a portion of the frame. Handle bar 24 is oscillatingly mounted upon the top of the steering post 20.

Wheel sprocket 26 is journaled to the fork 18, a portion of the frame 12, co-axially with the front wheel 16. A one-way free wheeling clutch 28 is mounted within housing or hub 30 of the sprocket 26. As is well known, the one-way free wheeling clutch will drive the front wheel 16 from the wheel sprocket 26 in a forward direction. However, it is free wheeling by which is meant, that the front wheel 16 will not drive the wheel sprocket 26.

Crank sprocket 32 is journaled to forward subframe 34. The forward subframe includes a top strut 36 extending from the top of the steering post 20. The forward subframe 34 also includes a bottom strut 38 extending from the fork 18 to the crank sprocket 32. The crank sprocket 32 is journaled to the subframe 34 at the connection of the top strut 36 to the bottom strut 38. Crank pin 40 is attached to the crank sprocket 32. Connecting rod or pitman 42 inner-connects the crank pin 40 and the handle bar 24. Chain 33 connects sprockets 26 and 32 so they rotate in unison.

Figure 4:
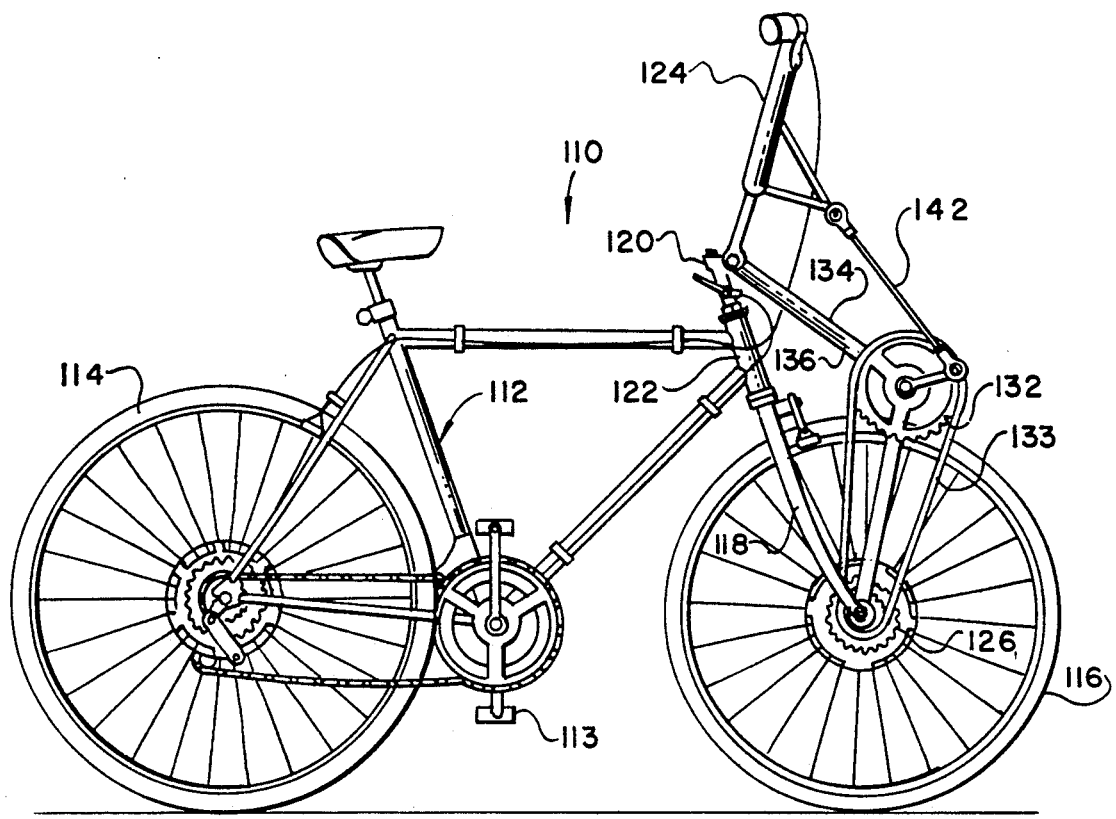
FIG. 4 is a side elevational view of the invention mounted upon a bicycle having pedal power as well as manual power.
Figure 3:
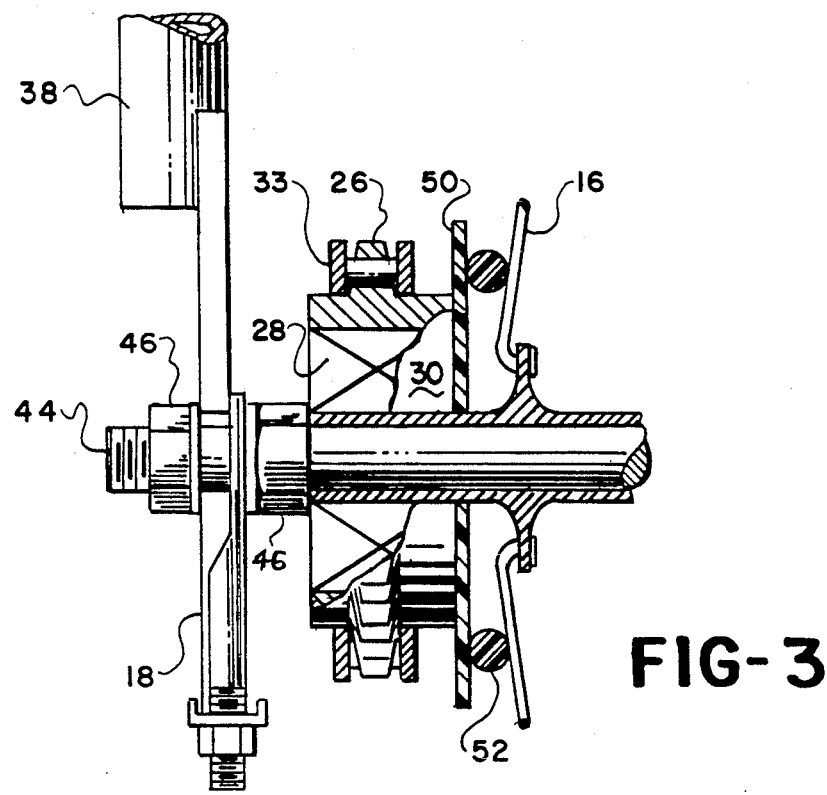
FIG. 3 is a sectional view taken substantially on line 3—3 of FIG. 2.

Referring to FIG. 4 of the drawing, it may be seen illustrated person powered bicycle 110. Likewise, it will have a frame 112 with rear wheel 114 journaled thereto. In the case of the bicycle 110 the rear wheel will be driven from pedals 113 journaled to the frame. This of course is well known in the bicycle arts. Front wheel 116 is journaled within fork 118 connected to steering post 120. The steering post is journaled within the support socket 122. Oscillating handle bars 124 are oscillated to steering post. Wheel sprocket 126 is journaled co-axially to the frame in the form of the fork 118 with the front wheel 116. The wheel sprocket and front wheel are connected by the one-way clutch 128 located within hub 130. Crank sprocket 132 is supported by the forward sub frame 134 including the top strut 136 and bottom strut 138. The crank sprocket 132 carries a crank pin 140. Pitman 142 inner-connects the crank pin 140 and the handle bars 124.

Those having ordinary skill in the art will understand that oscillating the handle bars 24 or 124 will drive the vehicle 10 or 110 forward. Of course in the case of the bicycle this will be an addition to what forward drive there may be obtained through the pedals 113.

The front wheel 16 is journaled to the fork 18 by axle 44 extending through the hub 30 and attached to the fork by nuts 46. The axle 44 is threaded on each end.

Both the front wheel 16 and the wheel sprocket 26 independently journaled about the axle 44.

The structure to this point is well known in the art and more specifically shown in my prior-to patents 4,147,370 and 4,189,166 discussed above.

Teflon fluor-carbon resins washer 50 is attached to the wheel sprocket 26. The Teflon fluor-carbon resins washer 50 is co-axial with the wheel and the sprocket and the axle 44.

Rubber O-ring 52 is attached to the front wheel 16 co-axially with the Teflon fluor-carbon resins washer 50, wheel sprocket 26 and the axle 44. The Teflon fluor-carbon resins washer 50 is pressed against the rubber O-ring 52 by the proper adjustment of the nuts 46.

It will be understood that Teflon fluor-carbon resins is considered to be an "anti-friction" material. By this it is meant that there is very small or very little friction between the Teflon fluor-carbon resins washer 50 and the rubber O-ring 52, however there is some. There are other low frictional materials; however, Teflon fluorcarbon resins is a preferred material as being readily available on the market at a reasonable cost.

The purpose of the slight friction between these two is to cause sufficient rotation of the wheel sprocket 26 to drive or bias or move the crank sprocket 32 by the connecting chain 33. The purpose of this drive or bias or move is to pull the crank sprocket 32 off dead center. As discussed above there is a problem with the pitman 42 becoming aligned with the axis of the crank sprocket 32 and the crank pin 40 so that oscillation of the handle bars 24 is blocked by being "on dead center". It is desirable that there be sufficient friction to drive or move the crank sprocket "off dead center". However, it is also desired that only the minimum friction be applied, because otherwise the friction between the front wheel 16 and the wheel sprocket 26 will reduce or counteract the free wheeling of the vehicle 10.

Those having ordinary skill in the art will understand that the adjustments of the nuts 46 are such as to press or bias the Teflon fluor-carbon resins washer 50 against the rubber O-ring 52 to achieve this relationship. The nuts 46 form a portion of tension means for pressing the Teflon fluor-carbon resins washer and the rubber O-ring together.

Also it will be understood that the Teflon fluor-carbon resins washer 50 and O-ring 52 form a portion of a frictional unit inner-connecting the front wheel to the wheel sprocket to frictionally drive the wheel sprocket from the front wheel.

It will be understood that the Teflon fluor-carbon resins washer and O-ring would be connected to the wheel sprocket 126 and the front wheel 116 of the vehicle 110 in the same manner as it was connected to the vehicle 10.

It may be seen that I have provided an improved method of preventing the vehicle from "locking down" because of the crank pin being on dead center.

The embodiment shown and described above is only exemplary. I do not claim to have invented all the parts, elements or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. On a person powered vehicle having
   a. a frame,
   b. at least two wheels journaled on the frame including,
   c. a front wheel,
   d. an oscillating handle bar on the frame,
   e. a wheel sprocket journaled to the frame,
   f. a one-way free wheeling clutch on the front wheel drivingly interconnecting the wheel sprocket and front wheel so that a forward directional movement of the sprocket will drive the wheel but the wheel cannot drive the sprocket through the clutch,
   g. a crank sprocket journaled on the frame having,
   h. a crank pin thereon,
   j. a pitman extending from the oscillating handle bar to the crank pin, and k. a chain drivingly interconnecting the wheel sprocket and the crank sprocket;
l. an improved structure for moving the crank sprocket off dead center comprising in combination with the above:
m. a frictional unit interconnecting the front wheel to the wheel sprocket to frictionally drive the wheel sprocket from the front wheel,
n. said front wheel is co-axial with wheel sprocket,
o. said frictional unit including,
   i. a synthetic resin polymer washer co-axially attached to the wheel sprocket,
   ii. a rubber O-ring co-axially attached to the front wheel, and
   iii. tension means for pressing the synthetic resin polymer washer and rubber O-ring together.

2. On a person powered vehicle having
a. a frame,
b. at least two wheels journaled on the frame including,
c. a front wheel,
d. an oscillating handle bar on the frame,
e. a wheel sprocket journaled to the frame,
f. a one-way free wheeling clutch on the front wheel drivingly interconnecting the wheel sprocket and front wheel so that a forward directional movement of the sprocket will drive the wheel but the wheel cannot drive the sprocket through the clutch,
g. a crank sprocket journaled on the frame having,
h. a crank pin thereon,
j. a pitman extending from the oscillating handle bar to the crank pin, and
k. a chain drivingly interconnecting the wheel sprocket and the crank sprocket;
l. an improved structure for moving the crank sprocket off dead center comprising in combination with the above:
m. a frictional unit interconnecting the front wheel to the wheel sprocket to frictionally drive the wheel sprocket from the front wheel,
n. said frictional unit applying a slight friction so that the operation of said free wheeling clutch is not reduced.

3. In the process of operating a person powered vehicle having
a. a frame,
b. at least two wheels journaled on the frame including,
c. a front wheel,
d. an oscillating handle bar on the frame,
e. a wheel sprocket journaled to the frame,
f. a one-way free wheeling clutch on the front wheel drivingly interconnecting the wheel sprocket and front wheel so that a forward directional movement of the sprocket will drive the wheel but the wheel cannot drive the sprocket through the clutch,
g. a crank sprocket journaled on the frame having,
h. a crank pin thereon,
j. a pitman extending from the oscillating handle bar to the crank pin, and
k. a chain drivingly interconnecting the wheel sprocket and the crank sprocket;
l. an improved structure for moving the crank sprocket off dead center comprising:
m. frictionally moving with slight friction the wheel sprocket from the front wheel so that the operation of said free wheeling clutch is not reduced.

4. In the process of operating a person powered vehicle having
a. a frame,
b. at least two wheels journaled on the frame including,
c. a front wheel,
d. an oscillating handle bar on the frame,
e. a wheel sprocket journaled to the frame,
f. a one-way free wheeling clutch on the front wheel drivingly interconnecting the wheel sprocket and front wheel so that a forward directional movement of the sprocket will drive the wheel but the wheel cannot drive the sprocket through the clutch,
g. a crank sprocket journaled on the frame having,
h. a crank pin thereon,
j. a pitman extending from the oscillating handle bar to the crank pin, and
k. a chain drivingly interconnecting the wheel sprocket and the crank sprocket;
l. an improved structure for moving the crank sprocket off dead center comprising:
m. frictionally driving the wheel sprocket from the front wheel,
n. said front wheel is co-axial with the wheel sprocket, and further comprising:
o. pressing a co-axial rubber O-ring on the front wheel against a co-axial Teflon washer on the wheel sprocket.

* * * * *